(12) United States Patent
Ravindran et al.

(10) Patent No.: US 11,048,325 B2
(45) Date of Patent: Jun. 29, 2021

(54) WEARABLE AUGMENTED REALITY HEAD MOUNTED DISPLAY DEVICE FOR PHONE CONTENT DISPLAY AND HEALTH MONITORING

(71) Applicant: Samsung Electronics Co., Ltd, Suwon-si (KR)

(72) Inventors: Sourabh Ravindran, Dallas, TX (US); Hamid R Sheikh, Allen, TX (US); Michael Polley, Garland, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 651 days.

(21) Appl. No.: 15/646,048

(22) Filed: Jul. 10, 2017

(65) Prior Publication Data

US 2019/0011978 A1    Jan. 10, 2019

(51) Int. Cl.
*G06F 3/01* (2006.01)
*G06F 3/147* (2006.01)
(Continued)

(52) U.S. Cl.
CPC .............. *G06F 3/011* (2013.01); *G06F 1/163* (2013.01); *G06F 1/1686* (2013.01);
(Continued)

(58) Field of Classification Search
None
See application file for complete search history.

(56) References Cited

U.S. PATENT DOCUMENTS 9,030,495 B2    5/2015    McCulloch et al.
9,122,053 B2    9/2015    Geisner et al.
(Continued)

FOREIGN PATENT DOCUMENTS

JP    2017-058971 A    3/2017
WO    2012/040107 A1    3/2012

OTHER PUBLICATIONS

Notification of Transmittal of the International Search Report and the Written Opinion of the International Searching Authority, or the Declaration dated Apr. 10, 2018 in connection with International Patent Application No. PCT/KR2017/014113.
(Continued)

*Primary Examiner* — YuJang Tswei (57) ABSTRACT

An embodiment of this disclosure provides a wearable device. The wearable device includes a memory configured to store a plurality of content for display, a transceiver configured to receive the plurality of content from a connected device, a display configured to display the plurality of content, and a processor coupled to the memory, the display, and the transceiver. The processor is configured to control the display to display at least some of the plurality of content in a spatially arranged format. The displayed content is on the display at a display position. The plurality of content, when shown on the connected device, is not in the spatially arranged format. The processor is also configured to receive movement information based on a movement of the wearable device. The processor is also configured to adjust the display position of the displayed content according to the movement information of the wearable device.

20 Claims, 10 Drawing Sheets

(51) Int. Cl.
*H04N 5/225* (2006.01)
*G06F 1/16* (2006.01)
*G06F 3/03* (2006.01)

(52) U.S. Cl.
CPC ............ *G06F 3/0304* (2013.01); *G06F 3/147* (2013.01); *H04N 5/225* (2013.01); *G09G 2320/028* (2013.01); *G09G 2320/0261* (2013.01); *G09G 2340/0464* (2013.01); *G09G 2370/022* (2013.01); *G09G 2370/027* (2013.01); *G09G 2370/04* (2013.01)

(56) References Cited

U.S. PATENT DOCUMENTS

| | | | |
|---|---|---|---|
| 9,141,194 B1* | 9/2015 | Keyes | G06F 3/017 |
| 9,265,415 B1 | 2/2016 | Starner et al. | |
| 9,310,612 B2 | 4/2016 | Cho et al. | |
| 9,311,718 B2 | 4/2016 | Scavezze et al. | |
| 9,330,499 B2 | 5/2016 | Perez et al. | |
| 9,348,141 B2 | 5/2016 | Bar-Zeev et al. | |
| 9,354,778 B2 | 5/2016 | Cornaby et al. | |
| 9,361,732 B2 | 6/2016 | Ebstyne et al. | |
| 9,368,546 B2 | 6/2016 | Fleck et al. | |
| 9,384,395 B2 | 7/2016 | Ryu | |
| 9,389,683 B2 | 7/2016 | Kim et al. | |
| 9,401,048 B2 | 7/2016 | Maciocci et al. | |
| 9,401,050 B2 | 7/2016 | Cajigas et al. | |
| 9,406,137 B2 | 8/2016 | Ahuja et al. | |
| 9,413,795 B2 | 8/2016 | Tseng | |
| 9,414,125 B2 | 8/2016 | Ferren et al. | |
| 2013/0147686 A1* | 6/2013 | Clavin | G06F 3/013 345/8 |
| 2014/0062854 A1 | 3/2014 | Cho et al. | |
| 2015/0138081 A1 | 5/2015 | Iwatsu et al. | |
| 2016/0117863 A1 | 4/2016 | Pugazhendhi et al. | |
| 2016/0343163 A1 | 11/2016 | Venkatesha et al. | |
| 2016/0370970 A1 | 12/2016 | Chu et al. | |
| 2017/0076503 A1 | 3/2017 | Tamaoki et al. | |
| 2017/0131964 A1 | 5/2017 | Baek et al. | |
| 2017/0206691 A1* | 7/2017 | Harrises | G02B 27/0172 |
| 2017/0337897 A1* | 11/2017 | Jung | G06F 3/012 |
| 2018/0011682 A1* | 1/2018 | Milevski | G06F 3/165 |
| 2019/0005297 A1* | 1/2019 | Ostberg | G06K 9/22 |

OTHER PUBLICATIONS

Supplementary Partial European Search Report in connection with counterpart European Patent Application No. 17917551.8 dated Jun. 22, 2020, 14 pages.

Examination Report dated Mar. 2, 2021 in connection with counterpart Indian Patent Application No. 201937048518, 3 pages.

* cited by examiner

WEARABLE AUGMENTED REALITY HEAD MOUNTED DISPLAY DEVICE FOR PHONE CONTENT DISPLAY AND HEALTH MONITORING

TECHNICAL FIELD

This disclosure relates generally to wireless communication systems. More specifically, this disclosure relates to an exemplary embodiment of a wearable augmented reality head mounted display device for phone content display and health monitoring.

BACKGROUND

Currently, devices are being used to provide augmented reality (AR) experiences. AR provides for is a technology enriching the real world with digital information. Head mounted display (HMD) devices are connected to a mobile device to display notifications and other information from a mobile device. The HMD devices also display content from a particular application from the mobile device. These HMDs do not provide access to all the content of the mobile device nor do they provide the visual and interactive experience of engaging with a mobile device. Other HMDs provide a more immersive and interactive experience but do not address the issue of displaying and interacting with all the phone content in a manner that leverages the advantages afforded by the HMD platform.

SUMMARY

An embodiment of this disclosure provides a wearable device. The wearable device includes a memory configured to store a plurality of content for display, a transceiver configured to receive the plurality of content from a connected device, a display configured to display the plurality of content, and a processor coupled to the memory, the display, and the transceiver. The processor is configured to control the display to display at least some of the plurality of content in a spatially arranged format. The displayed content is on the display at a display position. The plurality of content, when shown on the connected device, is not in the spatially arranged format. The processor is also configured to receive movement information based on a movement of the wearable device. The processor is also configured to adjust the display position of the displayed content according to the movement information of the wearable device.

Another embodiment of this disclosure provides a wearable device. The wearable device include at least one sensor configured to obtain environment information, a memory configured to store environment information, a display configured to display an alert based on the environment information, and at least one processor coupled to the memory, display, and the at least one sensor. The at least one processor is configured to receive the environment information from the at least one sensor. The at least one processor is also configured to determine whether the environment information triggers an alert. The at least one processor is also configured to control the display to display the alert within a field of vision of a user.

Yet another embodiment of this disclosure provides a wearable device. The wearable device includes a memory configured to store biometric feedback of a user, a display configured to display the biometric feedback, and at least one processor coupled to the memory and the display. The at least one processor is configured to control the display to display the biometric feedback within a field of vision of the user.

Yet a further embodiment of this disclosure provides a method of managing a plurality of content on a wearable device. The method includes receiving the plurality of content from a connected device. The plurality of content, when shown on the connected device, is not in a spatially arranged format. The method also includes displaying at least some of the plurality of content on a display of the wearable device in a spatially arranged format. The displayed content on the display is at a display position. The method also includes receiving movement information based on a movement of the wearable device. The method also includes adjusting the display position of the displayed content according to the movement information of the wearable device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Various embodiments of this disclosure recognize and take into account that there are no devices in the market that can measure bio-signals along with other parameters of user health/activity and display the bio-signals in real-time in the viewer's field-of-view (FOV). One or more embodiments of this disclosure provide an HMD device that provides access and interaction with mobile device content that enhances the visual experience by leveraging the spatial arrangement afforded by the HMD display format. The embodiments also provide measurement and displaying various parameters, in real-time, related to the health of a user and activity within the users FOV.

Figure 1:
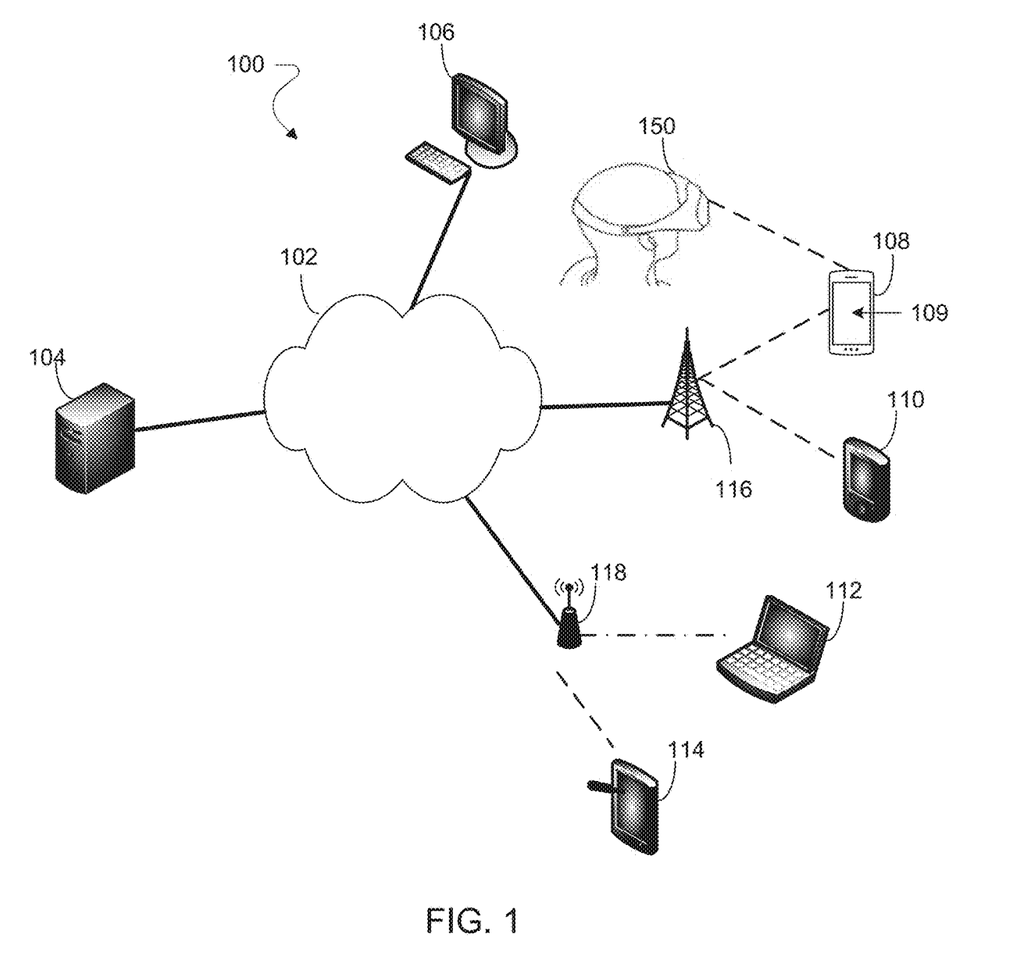
FIG. 1 illustrates an example computing system in which one or more embodiments of the present disclosure may be implemented.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or connected device 108 with touchscreen input 109, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, one or more of client devices 106-114 can communicate with an HMD 150. For example, connected device 108 can be paired with HMD 150. When paired, the connected device 108 can send display information or touch input information to HMD 150. HMD 150 can also be referred to herein as a wearable device. The display information can include content, such as images and videos, biosensor information, user interface (UI) elements, settings, and other content normally displayed by connected device 108 on touchscreen input 109.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any configuration. While FIG. 1 illustrates one operational environment in which various features disclosed in this patent document can be used, these features could be used in any other suitable system.

Figure 2:
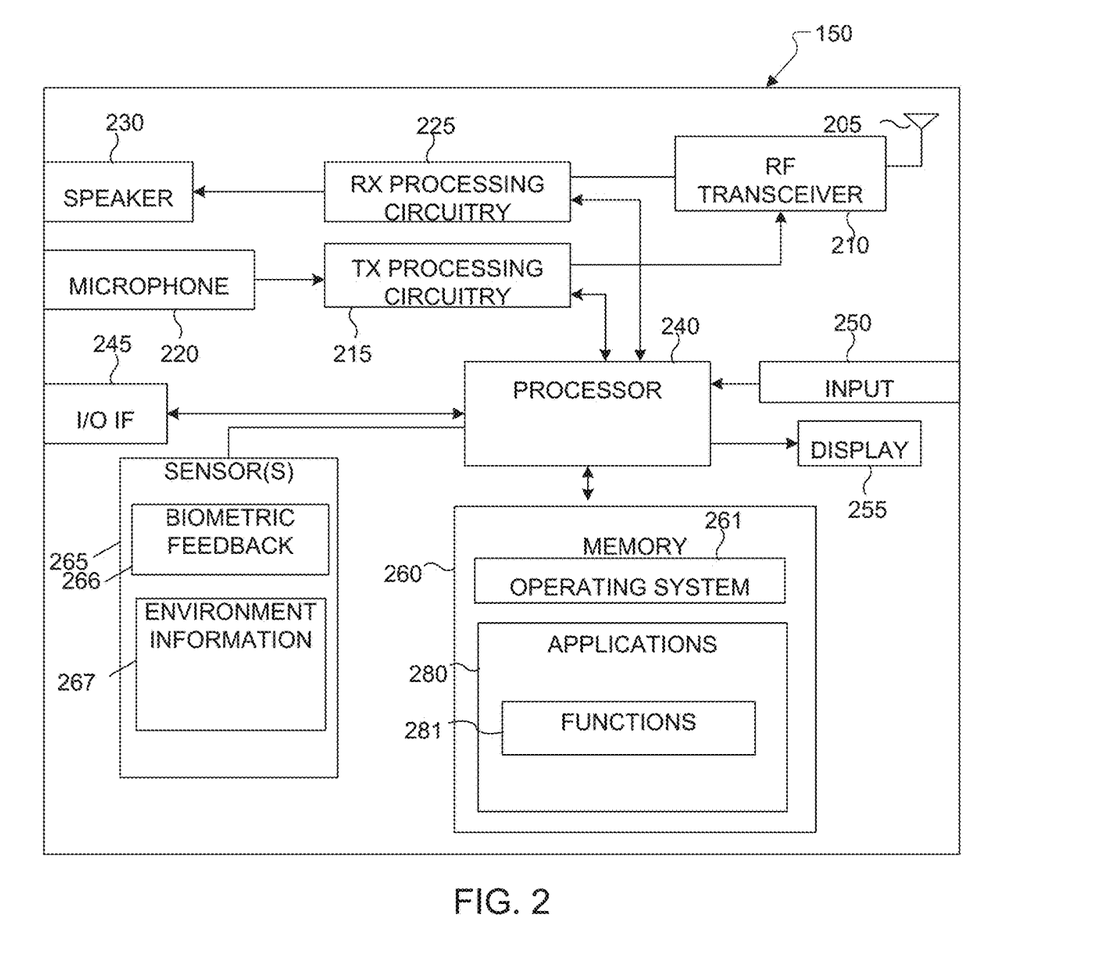
FIG. 2 illustrates an example HMD according to embodiments of the present disclosure and in which embodiments of the present disclosure may be implemented.

FIG. 2 illustrates an example HMD 200 according to embodiments of the present disclosure and in which embodiments of the present disclosure may be implemented. The embodiment of the HMD 200 illustrated in FIG. 2 is for illustration only, the HMD 200 comes in a wide variety of configurations, and FIG. 2 does not limit the scope of this disclosure to any implementation of a HMD. HMD 200 can be one example of a HMD 150 as shown in FIG. 1.

In various embodiments, the HMD 200 may take different forms, and the present disclosure is not limited to any form. For example, the HMD 200 may include the headset and take the form of a wearable electronic device, such as, for example, glasses, goggles, a helmet, etc., for applications. In other examples, the HMD 200 may be a mobile communication device, such as, for example, a user equipment, a mobile station, a subscriber station, a wireless terminal, a smart phone, a tablet, etc., that is mountable within a headset for applications.

As shown in FIG. 2, the HMD 200 includes an antenna 205, a radio frequency (RF) transceiver 210, transmit (TX) processing circuitry 215, a microphone 220, and receive (RX) processing circuitry 225. The HMD 200 also includes a speaker 230, a processor 240, an input/output (I/O) interface (IF) 245, an input 250, a display 255, a memory 260, and one or more sensors 265. The memory 260 includes an operating system (OS) 261.

The RF transceiver 210 receives, from the antenna 205, an incoming RF signal transmitted by a mobile device (e.g., connected device 108 of FIG. 1) for a network (e.g., a Wi-Fi, Bluetooth, cellular, 5G, LTE, LTE-A, WiMAX, or any other type of wireless network). The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for display data).

In one or more embodiments, the speaker 230 may take the form of an in-ear headphone or multiple headphones. The in-ear headphones can be positioned within the ear or near the ear. The speaker 230 can provide audio from a phone call, music, alerts, etc.

The TX processing circuitry 215 receives analog or digital voice data from the microphone 220 or other outgoing baseband data (such as video or sensor data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processing devices and execute the OS 261 stored in the memory 260 in order to control the overall operation of the HMD 200. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller. On another embodiment, the processor 240 could also be implemented as processing circuitry. The processor 240 can carry out the operations or instructions of any process disclosed herein.

The processor 240 is also capable of executing other processes and programs resident in the memory 260. The processor 240 can move data into or out of the memory 260 as required by an executing process. In some embodiments, the processor 240 is configured to execute applications based on the OS 261 or in response to signals received from connected device 108 of FIG. 1 or an operator. The processor 240 is also coupled to the I/O interface 245, which provides the HMD 200 with the ability to connect to other devices, such as laptop computers and handheld computers. The I/O interface 245 is the communication path between these accessories and the processor 240.

The processor 240 is also coupled to the display 255. The display 255 may be a liquid crystal display (LCD), liquid crystal on silicon (LCoS) display, light-emitting diode (LED) display, organic LED (OLED), active matrix OLED (AMOLED), or other display capable of rendering text and/or graphics, such as from web sites, videos, a user interface, images, games, etc.

The memory 260 is coupled to the processor 240. Part of the memory 260 could include a random access memory (RAM), and another part of the memory 260 could include a Flash memory or other read-only memory (ROM). Memory 260 can also include applications 280. For example, an application may be an email application or web browser. The applications 280 can include functions 281. For example, functions may include opening a new email item or going forward and back in a web browser.

HMD 150 further includes one or more sensor(s) 265 that can meter a physical quantity or detect an activation state of the HMD 150 or user of the HMD 150 and convert metered or detected information into an electrical signal. For example, sensor 265 may include a camera, a gesture sensor, a gyroscope or gyro sensor, an air pressure sensor, a magnetic sensor or magnetometer, an acceleration sensor or accelerometer, a proximity sensor, a color sensor 265H (e.g., a Red Green Blue (RGB) sensor), a bio-physical sensor, a temperature/humidity sensor, an illumination sensor 265K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, etc. The sensor(s) 265 can further include a control circuit for controlling at least one of the sensor(s) 265 included therein. As will be discussed in greater detail below, one or more of these sensor(s) 265 may be used to obtain biometric feedback 266, which can include biometric information from a user, for example, user health and activity parameters such as the electrical activity of the heart (using ECG), blood pressure, hydration, respiration, blood oxygen saturation, or calories burned, and also user metrics such as activity, activity duration, distance traveled, position tracking, or pace. Any of these sensor(s) 265 may be located within the HMD 150, within a connected device 108 connected to the HMD 150, or in both the connected device 108 and HMD 150.

Sensor(s) 265 may also be sued to obtain environment information 267. Environment information 267 can include, but is not limited to, ambient audio, sirens, loud noises, proximities of objects and other people, etc. The processor 240 can be configured to compare the environment information 267 to predetermined criteria to determine whether an alert is triggered.

The input 250 can include a touch panel or a physical button. The input 250 can recognize, for example, a touch input in at least one scheme among a capacitive scheme, a pressure sensitive scheme, an infrared scheme, or an ultrasonic scheme. The input 250 can also include a control circuit. In the capacitive scheme, the input 250 can recognize touch or proximity. In one or more embodiments, HMD 150 receives input from connected device 108 through the use of touchscreen input 109.

In one or more embodiments of this disclosure, certain information is only displayed if the connected device 108 (also referred to as UE or smartphone) is within a threshold range of the HMD 150. This threshold range could be either determined by BLUETOOTH LOW ENERGY (BLE) signal strength or some other wireless communication such as near field communication (NFC). In other embodiments, the threshold range could be determined by whether a connection to the connected device exists. The HMD 150 could determine whether the connected device is within a threshold range of the wearable device, determine whether any of the plurality of content is restricted content, and control the display of the restricted content based on whether the connected device is within the threshold range.

As described in more detail below, the HMD 150 may include circuitry and applications for displaying the content of a connected mobile device with a UI that takes advantage of the spatial extent afforded by HMD format. Spatial viewing provides a unique way for a user to consume and interact with mobile device content. The HMD 150 provides a spatially rendered UI that the user can navigate by physically moving (change in orientation or translation). The rendered content could either be stored on the HMD 150 with content updated from the mobile device or the content could be streamed wirelessly from the mobile device.

The HMD 150 also provides the functionality of measuring and displaying in real-time certain user health and activity parameters such as ECG, blood pressure, hydration, respiration, blood oxygen saturation, or calories burned, in addition to user metrics such as activity, activity duration, distance traveled, position tracking, or pace.

Although FIG. 2 illustrates one example of HMD 150, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the HMD 150 configured as a mobile telephone, tablet, or smartphone, the HMD 1540 could be configured to operate as other types of mobile or stationary devices. The HMD 150 can work in cooperation and as part of wireless network 100 as shown in FIG. 1.

Figure 3:
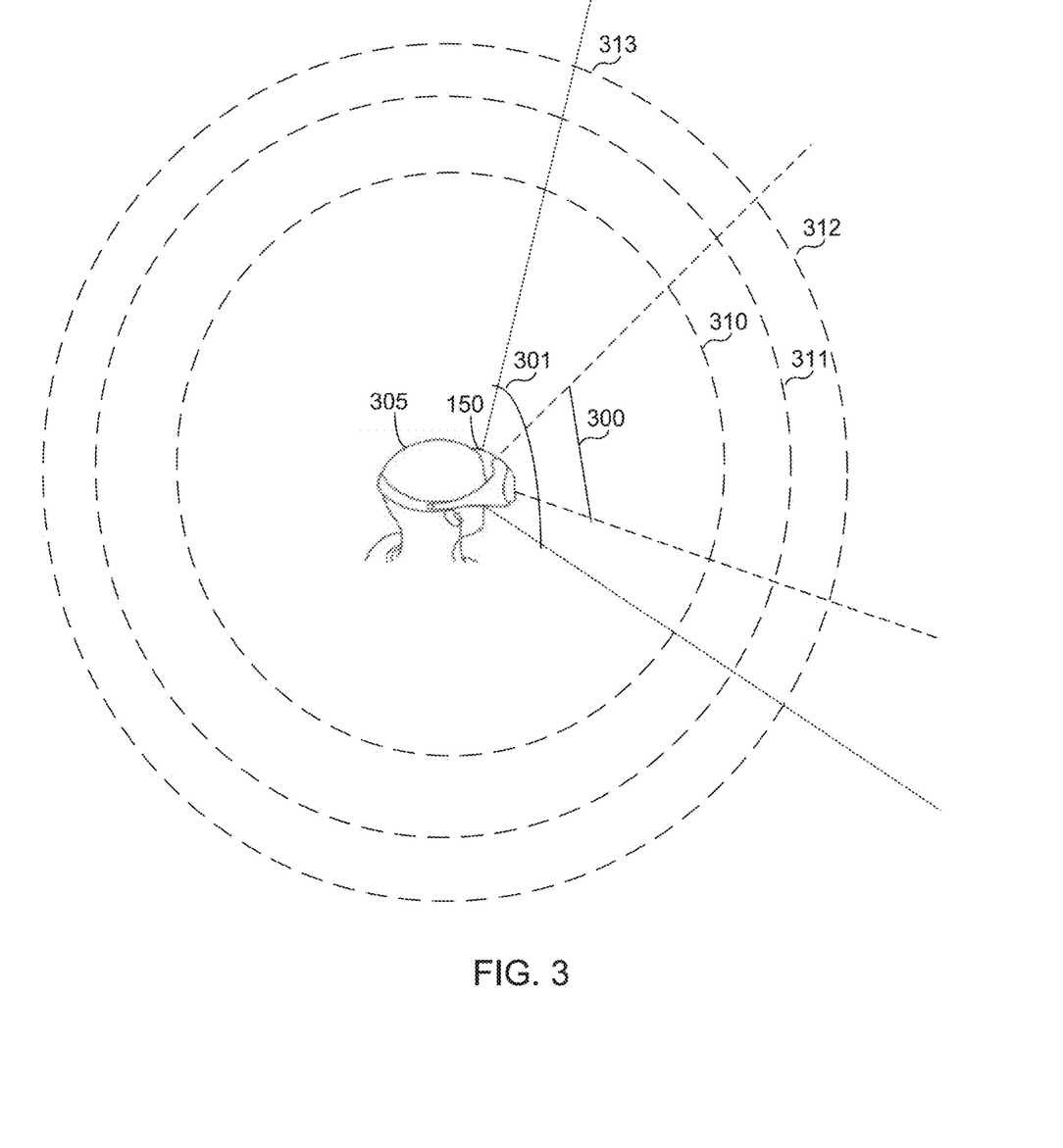
FIG. 3 illustrates an example viewing angle of an HMD with respect to a user according to an embodiment of this disclosure.

FIG. 3 illustrates an example viewing angle 300 of an HMD 150 with respect to a user 305 according to an embodiment of this disclosure. In FIG. 3, a user 305 is seen wearing the HMD 150. The viewing angle 300 shown in FIG. 3 is for illustration only. Other embodiments of a viewing angle could be used without departing from the scope of this disclosure.

The viewing angle 300 is the angle of view through the display of the HMD 150. The viewing angle 300 could be limited by the display screen of the HMD 150. Within the viewing angle 300, the HMD 150 can provide augmented reality or content from user equipment. In different embodiments, different viewing angles may be used. For example, the viewing angle 300 may include all possible angles of view for a user. As depicted herein, the viewing angle 300 is shown in a horizontal direction. However, in the embodiments presented herein, there is also a viewing angle in a vertical direction, which may be the same or different angle as in the horizontal direction. When the HMD 150 is in the form of, for example glasses, the sides may be open such that the user field of vision 301 is greater than the viewing angle 300. The field of vision 301 is the viewable area for a user without moving his or her head.

As described herein, content 310-313 may be displayed spatially. When displayed spatially, some of the content 310-312 may appear in the viewing angle 300, and therefore displayed on a screen of the HMD 150, while other content 313 may exist outside of the viewing angle 300. When a user 305 moves or rotates the HMD 150, the viewing angle 300 may keep the content spatially positioned in the same coordinate location where new content is moved within the viewing angle 300 is displayed and previously displayed content that was previously in the viewing angle 300 is no longer displayed. That is, the content is moved on the display in response to movement of the HMD 150.

In another embodiment, the content rotates and moves with the HMD 150. For example, if a user 305 moves and the viewing angle 300 moves, the same content that was previously within the viewing angle 300 is maintained within the viewing angle 300. Rather than movement of the content with movement of the HMD 150, this content could be moved by a user interface, such as a touchscreen on the user equipment. Moving the content through input from the user equipment can also be combined with moving the content through movement of the HMD 150.

An angular range (e.g., on the x-y-z plane assuming a Cartesian coordinate system with the x direction generally denoting left/right or yaw, the y direction generally denoting forward/backwards, and the z direction generally denoting up/down or pitch), within which content is to be placed is configured. In some examples, (e.g., when more content exists than can fit), the HMD 150 displays, either actually or virtually (i.e., not actually displayed on the display but actually displayed when the HMD 150 is moved to a location where the element is virtually displayed), some content outside the current viewing angle 300. Note, while certain examples are given in a Cartesian coordinate system, any suitable coordinate system may be used with any tuple serving as the default coordinate directions. The HMD 150 places the content within the user's current viewing angle, i.e., the portion of the total viewable space that is currently viewable by the user as a result of the HMD's 150 current detected orientation and facing direction.

An x-y-z coordinate system can be referred to herein as a coordinate space. The content can exist within the coordinate space in virtual positions. For example, the virtual position of content 310-312 is within the viewing angle 300 and therefore currently displayed on the HMD 150. Content 313 has a virtual position outside of viewing angle 300 and therefore not currently displayed. When HMD 150 rotates or moves within the coordinate space, the content 310-313 may maintain the virtual positions within the space depending on user settings. For example, if the content has been anchored. This content may be further manipulated via an interface of the HMD 150. Through speech input, touch input, etc. of a connected device, a user may move or adjust the content without moving the HMD 150. In this example, when moved via the interface of a connected device, such as a UE, the virtual position of the content changes within the coordinate space.

As discussed above, the HMD 150 detects the user's head motions, i.e., the movement of the HMD 150, using the sensor(s) 165 on the HMD 150 and/or headset, such as, for example, a gyroscope, an accelerometer, etc. The HMD 150 displays the content as well as other elements of the display (e.g., content) to respond to the head motions to simulate looking at and interacting with the real-world view and objects. Other content, such as UE content, may be displayed spatially and without movement according to the movement of the HMD 150. The UE content can include, but not limited to, streaming video content, photos, user interface elements, weather conditions, alerts, settings, etc.

The spatial arrangement can have different forms. For example, the spatial arrangement can include multiple levels of content. As shown in FIG. 3, content 310 exists at a first level, content 311 exists at a second level, and content 312 and 313 exist at a third level. In one example, while all levels of content are displayed, the user can move forward to advance to a second level of content for clearer viewing of that level of content. This content would maintain a virtual position while the HMD 150 moves within the coordinate space. In another example, only one level of content is displayed at any time. When the user moved forward, a different level of content may be displayed. In yet another example, rather than the content wrap around the user in a 360-degree format, the content may be shown in straight rows and columns.

Although FIG. 3 illustrates one example of a viewing angle 300, various changes may be made to FIG. 3. For example, a user is wearing the HMD 150 and is seeing the view within the viewing angle 300. As depicted herein, the sides of the HMD 150 appear to be opaque. In other embodiment, the sides may be open and the HMD 150 may take the form of glasses. In that embodiment, the viewing angle 300 remains as the view through the display of the HMD 150, but the user 305 may also see outside of the viewing angle. In general, HMDs come in a wide variety of configurations, and FIG. 3 does not limit the scope of this disclosure to any configuration.

Figure 4A:
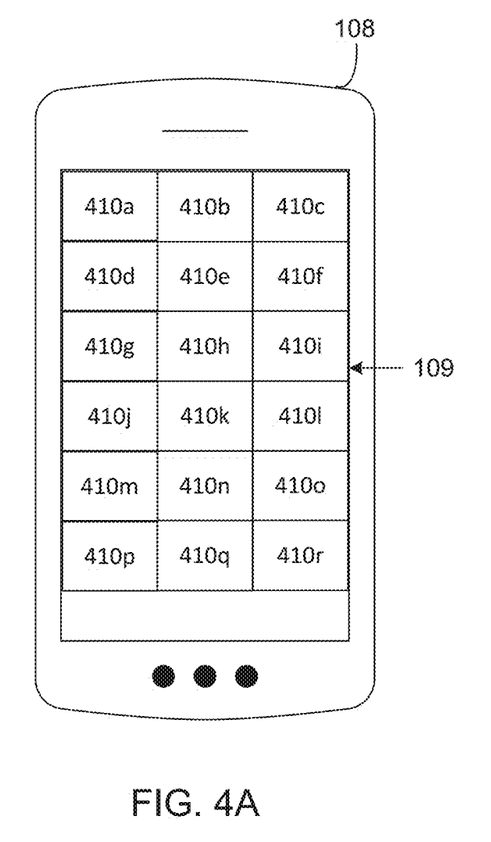
FIG. 4A illustrates an example UE 108 according to embodiments of this disclosure.

FIG. 4A illustrates an example connected device 108 according to embodiments of this disclosure. The connected 108 shown in FIG. 4A is for illustration only. Other embodiments of a connected could be used without departing from the scope of this disclosure.

In FIG. 4A, connected device 108 includes touchscreen input 109. Touchscreen input 109 is shown displaying content 410. Content 410 can be images and videos, biosensor information, UI elements, settings, and other content normally displayed by connected device 108. As shown in FIG. 4A, the content 410 is displayed in a non-HMD format.

Figure 4B:
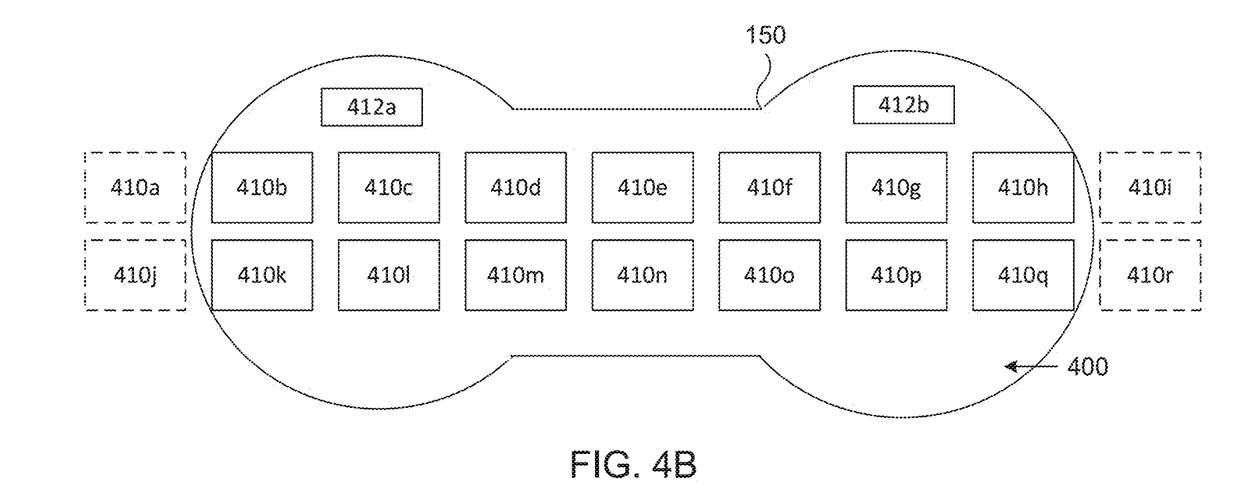
FIGS. 4B, 4C and 4D illustrate an example display of an HMD according to embodiments of this disclosure.
Figure 4C:
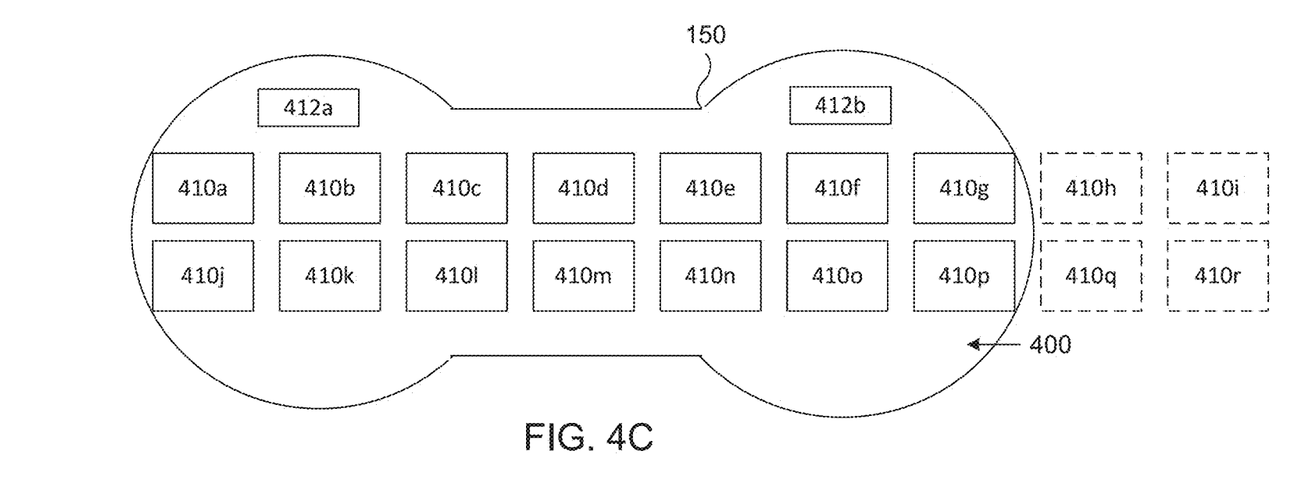
Figure 4D:
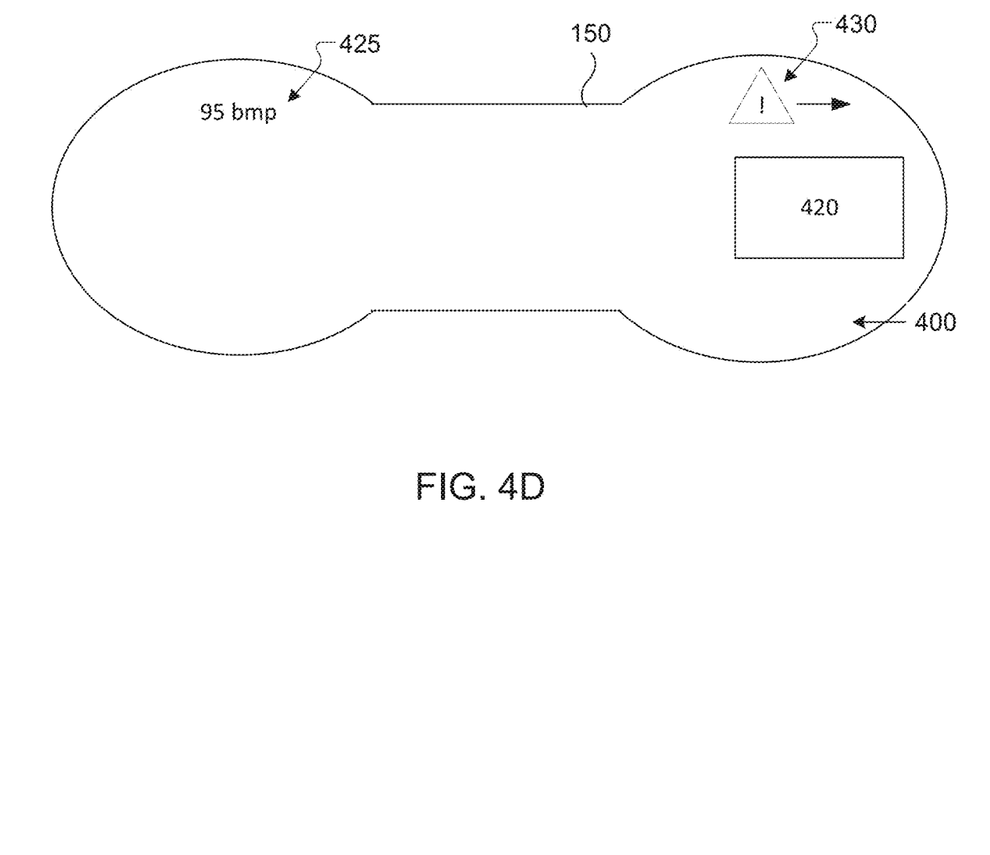

FIGS. 4B-4D illustrate an example display 400 of an HMD 150 according to embodiments of this disclosure. The display 400 shown in FIGS. 4C-4D is for illustration only. Other embodiments of a display could be used without departing from the scope of this disclosure. For example, the size and shape of the display may be dependent on the frame or structure of the glasses. Additionally, an apparatus, such as glasses, may include multiple displays rather than a single display.

In FIG. 4B, display of content 410 is shown depicted on the display 400. The display may be partially or completely translucent, allowing a user to view past the display 400 to view physical objects. The display 400 is configured to depict different content. Content 410 can be received from connected device 108. Content 410 is displayed in an HMD format. The HMD format provides for the content to be spatially arranged. The content can be positioned in coordinate space without restriction of the display 400. The position of the content 410 in coordinate space is the virtual position of the content 410. The position of the content on display 400 is the display position.

In this embodiment, the content 410 is shown in two rows with multiple columns that extend beyond the display 400. Content 410a, 410i, 410j, and 410r exist beyond the display 400 and therefore are not currently displayed. Content 412 is also displayed on display 400.

In FIG. 4C, display 400 is shown after rotation of the HMD to the left. In this example, a user could turn to the left and content 410a and 410j would then be positioned onto the display 400, and content 410h and 410q would then be removed from the display 400. As shown in FIG. 4C, the virtual position of the content 410 is maintained while the display position of the content 410 is adjusted.

Content 412 is anchored content and maintains a display position on display 400 while the display position content 410 is adjusted (i.e., moved or adapted). That is, content 412 maintains a display position and adjusts a coordinate position. Whether content is unanchored, such as content 410, that adjusts position based on movement of the HMD, or whether the content is anchored content, such as content 412, can depend on user settings, metadata, information from the UE, etc.

While content 410 is depicted in two rows, there could be additional rows that show further content when a user rotates the HMD up or down. Likewise, content 412 may be positioned in different places on display 400.

In various embodiments, content 410 may represent content of an application. For example, the application may be an email application. Rotating the HMD 150 to the left or right may bring up another email. In different embodiments, other motions may be used and other applications may have specific movements to perform specific functions, such as functions 281 as shown in FIG. 2.

In FIG. 4D, display 400 includes content 420, information 425, and alert 430. Content 420 could be, for example, image or video content. Content 420 could include playback of movies or images, video chat, or a camera feed from HMD 150. HMD 150 could include a camera that captures video behind a user or to the side of a user. This video can then be played back as content 420 on display 400.

Information 425 can show biometric feedback 266 of FIG. 2, or other sensor data. For example, information 425 can include health and activity parameters such as ECG, blood pressure, hydration, respiration, blood oxygen saturation, or calories burned, and also user metrics such as activity, activity duration, distance traveled, position tracking, or pace. Information 425 can also provide other information such as, but not limited to, weather or other news information or caller identification for calls received on connected device 108.

Alert 430 can alert a user to dangerous or other important conditions based on environment information 267 of FIG. 2. A sensor, such as a camera or proximity sensor can identify an oncoming collision or approaching object and alert the user. As depicted in FIG. 4D, an alert is shown to the right of HMD 150. The alert can also inform a user as to a road or path obstacle.

The HMD 150 can include in-ear headphones that can stream audio either from the HMD 150 or from the connected device. The HMD 150 is equipped to provide situational awareness, i.e. use sensors on the HMD 150 such as cameras and microphones to detect situations relevant to the user in the present context and provide cues or alerts.

These alerts can be conveyed as a display on the screen or as audio cues to the in-ear speakers. The HMD 150 would also have the ability to dim or completely turn-off or dim the display 400 to bring the users attention to the present moment. When the display is dimmed or turned-off, the user is more able to see through the glasses. Similarly audio volume of the in-ear phones could be reduced or completely shut-off and ambient audio provided to the in-ear phones to enable the user to hear. The ambient audio would preserve the direction of arrival cues.

Figure 5:
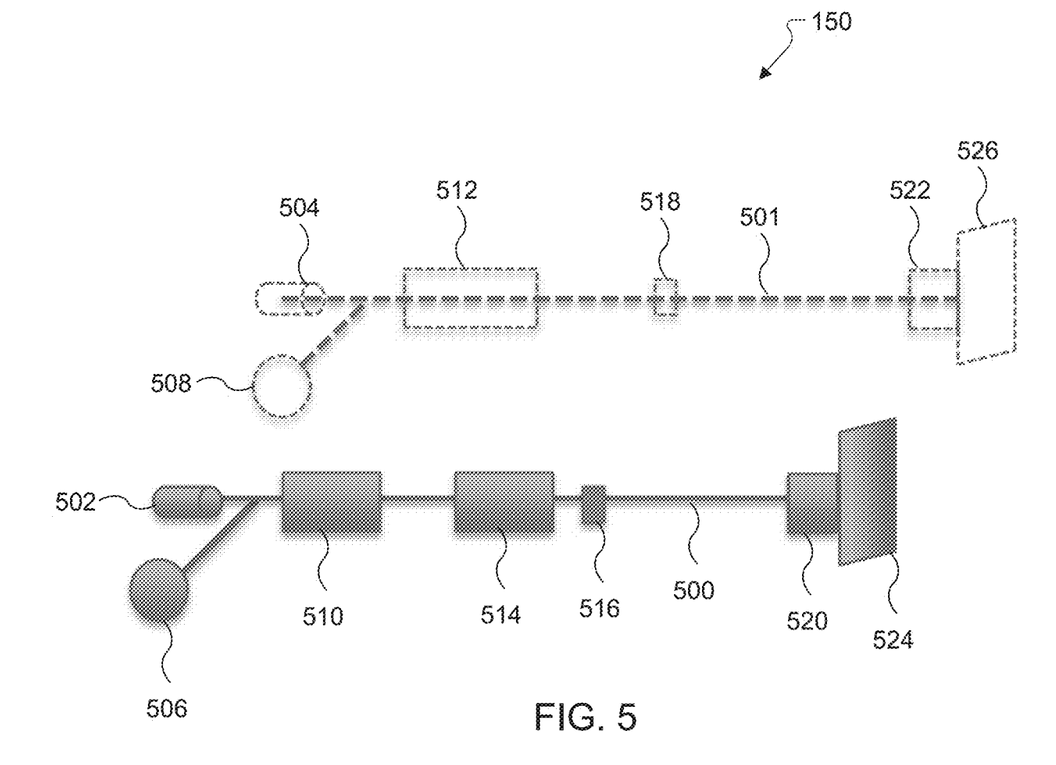
FIG. 5 illustrates components of an HMD according to an embodiment of this disclosure.

FIG. 5 illustrates components of an HMD 150 according to an embodiment of this disclosure. The components shown in FIG. 5 are for illustration only. Other embodiments of an HMD 150 could be used without departing from the scope of this disclosure.

In one embodiment, in glasses form, the HMD 150 includes stems 500 and 501 to form a frame. The frame includes cameras 502 and 504, sensor modules 506 and 508, batteries 510 and 512, processor 514, microphones 516 and 518, micro-displays 520 and 522, and displays 524 and 526.

Cameras 502 and 504 can be one example of sensor(s) 265 of FIG. 2. Cameras 502 and 504 can be used to record video or images behind and/or to the side of a user. Sensor modules 506 and 508 can obtain biometric feedback, for example, ECG, galvanic skin response (GSR), and photoplethysmogram (PPG). Other biometric feedback 266 can also be obtained by sensor modules 506 and 508.

In an embodiment, batteries 510 and 512 may be any type of battery, including, but not limited to, lithium ion, lithium polymer, nickel cadmium, etc. The batteries 510 and 512 may also be further charged by solar, motion, etc. Microphones 516 and 518 can be examples of microphone 220 of FIG. 2. Speakers, such as speaker 230 of FIG. 2 may also be included on the frame.

Processor 514 may be one example of processor 240. Processor 514 may drive the micro-displays 520 and 522 and displays 524 and 526, as well as other components on the frame. The processor may control a transceiver, such as transceiver 210 to communicate with connected device 108. Processor 514 may perform signal processing, audio and video processing and streaming, wireless communication, GPS services, etc. The processor 514 may be coupled to or include a memory element, digital storage, accelerometer, gyroscope, magnetometer, microphone, and flash. Micro-displays 520 and 522 and displays 524 and 526 can be used to display content as discussed in FIGS. 4A-4D.

Figure 6:
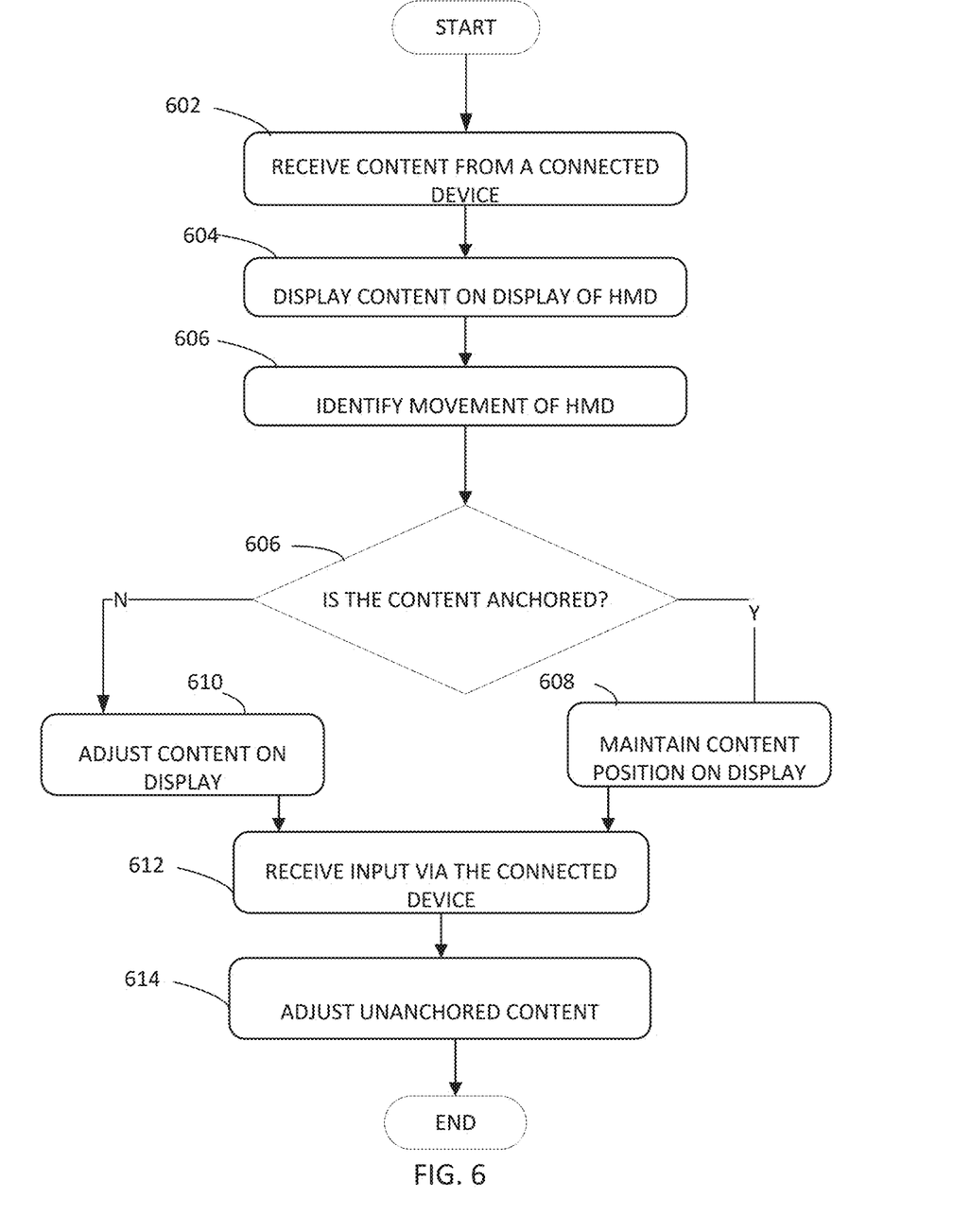
FIG. 6 illustrates an example process for managing a plurality of content according to embodiments of the present disclosure.

FIG. 6 illustrates an example process 600 for managing a plurality of content according to embodiments of the present disclosure. The embodiment of the process 600 illustrated in FIG. 6 is for illustration only. However, the process 600 comes in a wide variety of configurations, and FIG. 6 does not limit the scope of this disclosure to any particular implementation for managing a plurality of content. The steps as presented in FIG. 6 can be performed by HMD 150 as shown in FIG. 2.

As shown in FIG. 6, at operation 602, an HMD 150 receives content from a connected device 108. The content, when shown on the connected device, is not in a spatially arranged format. The content could include UI elements, settings, videos, photos, etc. The content can be received through wired or wireless communications. The content could either be stored on the HMD 150 with content updated from the connected device or the content could be streamed wirelessly from the connected device.

At operation 604, the HMD 150 displays the content on a display 255 of the HMD 150. The content is displayed in a spatially arranged format, which allows a user to navigate by physically moving (change in orientation or translation). At operation 606, the HMD 150 can determine whether the content is anchored. Content can be anchored based on user settings, content type, application settings, etc. If the content is anchored, at operation 608 the HMD 150 maintains a display position of the content on the display during the movement of the HMD 150.

If the content is not anchored, at operation 610 the HMD 150 adjusts the display position of the content on the display. In additional examples, the movement can cause content that is not currently displayed, to be displayed. This content may have a virtual position outside of the viewing angle prior to the movement, but become within the viewing angle after the movement.

In one example, the user can walk in a direction and content displayed in that direction can be rendered (i.e., displayed) to give the impression of moving closer to the user. The user's position and orientation within the coordinate space is tracked and content is displayed accordingly. A touchscreen 109 of the connected device 108 can be used to select a content (or icon) by moving a cursor over the content and tapping (similar to how an app is opened on a mobile device). Once an app is opened, its contents are also spatially displayed.

At operation 612, the HMD 150 can receive an input via the connected device 108. At operation 614, the HMD 150 can adjust the unanchored content. This input can be an interaction mode where the user uses the touchscreen 109 of the connected device 108 to navigate and interact with the content displayed by the HMD 150. For instance, in an example where content (including icons) are spatially arranged around the user, swiping left-to-right would move the icons in the center of the visual field spatially to the right and bring in content that is spatially on the user's left to the center or "pinch and zoom" would bring the further away content, such as content at a third level, content 312 of FIG. 3, closer. Having the content spatially move in this manner gives the feel of physically moving closer to those content.

In another embodiment, certain information can be linked to the motion of the connected device and certain other information can be linked to the motion of the HMD 150. For example, a messenger icon can be anchored to the display such that the icon is always in the user's field of vision even when the user moves their head, whereas the unanchored content (such as music files) could be maintained in a virtual position such that the files displayed would change on the display with the user's orientation and position. The content anchored to the display could be linked to physical movement of the phone so that moving the phone to the left would move the anchored content to the left, etc.

Although FIG. 6 illustrates example process 600 for creating or using an image calibration scheme, various changes could be made to FIG. 6. For example, while shown as a series of operations, various operations in each figure could overlap, occur in parallel, occur in a different order, or occur multiple times. For example, operations 612 and 614 may be performed separately from operations 606 and 610.

Figure 7:
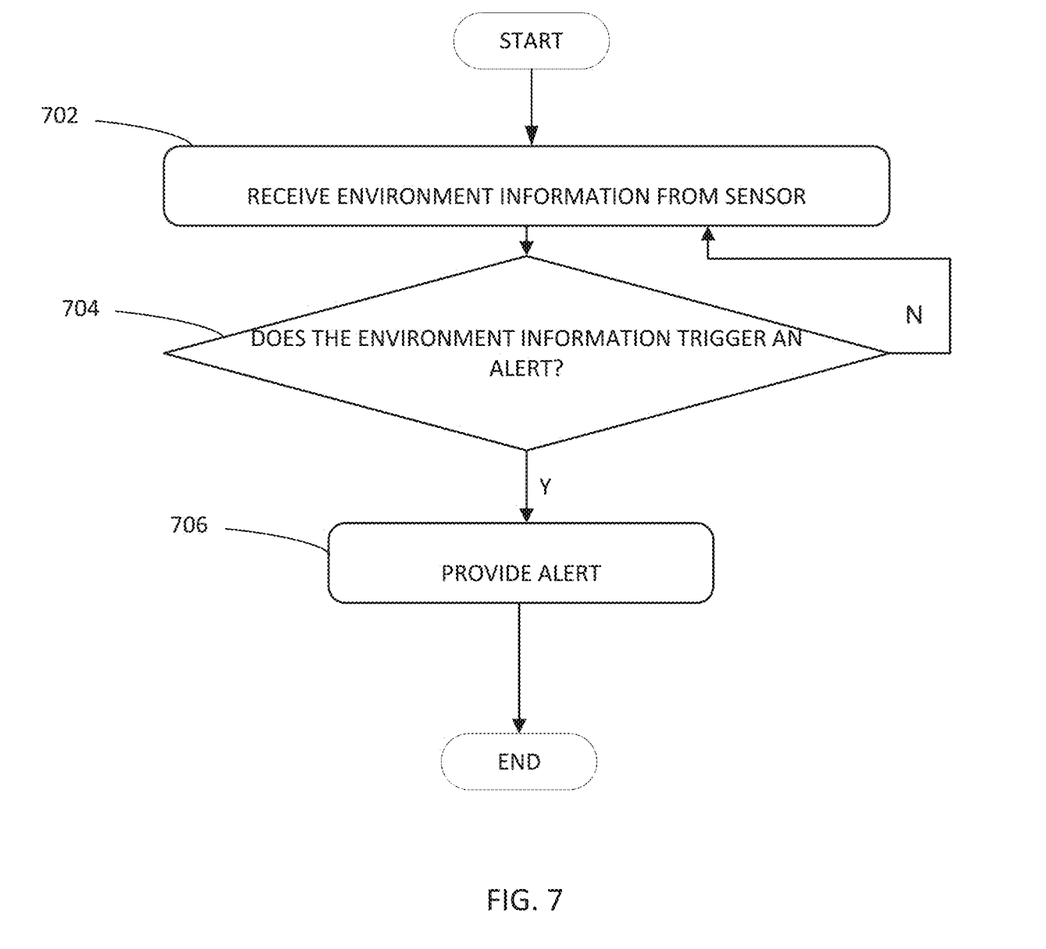
FIG. 7 illustrates an example process for alerting a user according to embodiments of the present disclosure.

FIG. 7 illustrates an example process 700 for alerting a user according to embodiments of the present disclosure. The embodiment of the process 700 illustrated in FIG. 7 is for illustration only. However, the process 700 comes in a wide variety of configurations, and FIG. 7 does not limit the scope of this disclosure to any particular implementation for alerting a user. The operations as presented in FIG. 7 can be performed by HMD 150 as shown in FIG. 2.

As shown in FIG. 7, at operation 702, an HMD 150 receives environment information from sensors. The sensors could include a camera, microphone, proximity sensor, etc. These sensors obtain information about the surrounding area of the user.

At operation 704, the HMD 150 determines whether the environment information triggers and alert. The HMD 150 could monitor this information against predefined criteria. For example, the proximity sensor could be monitored against a threshold distance, the camera could monitor a range of approaching objects or people, and the microphone can be measured against a decibel level or monitor for emergency noises, such as sirens.

At operation 706, when the HMD determines that an alert is triggered, the HMD 150 provides the alert to the user. The alert can be provided by displaying on the display of the HMD 150, by reducing the volume of the speakers or headphones to allow a user to hear the noise that triggered the alert, by showing the user a video feed from a camera that captures video outside of the user's field of vision, by making an audible alert in the headphones or speakers, etc. If no alert is triggered, the process 700 continues to monitor the information. In another example, the HMD 150 can dim the display during the alert to allow the user a better view of the surroundings.

Although FIG. 7 illustrates example process 700 for alerting a user, various changes could be made to FIG. 7. For example, while shown as a series of steps, various steps in each figure could overlap, occur in parallel, occur in a different order, or occur multiple times.

Figure 8:
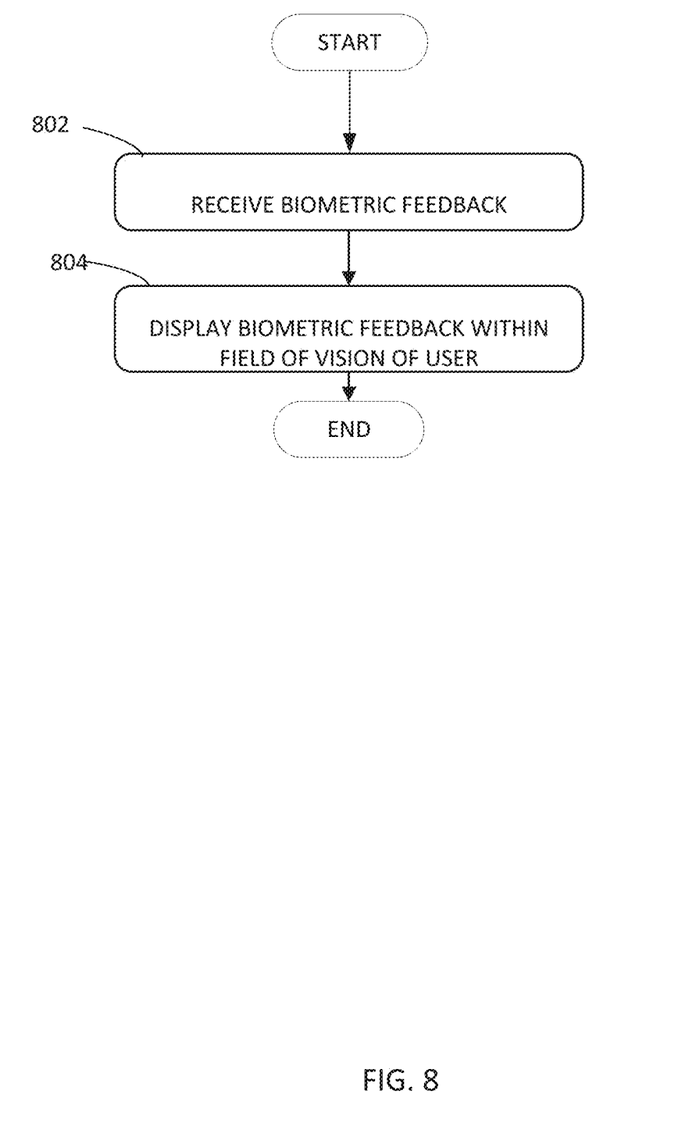
FIG. 8 illustrates an example process for providing biometric feedback to a user according to embodiments of the present disclosure.

FIG. 8 illustrates an example process 800 for providing biometric feedback to a user according to embodiments of the present disclosure. The embodiment of the process 800 illustrated in FIG. 8 is for illustration only. However, the process 800 comes in a wide variety of configurations, and FIG. 8 does not limit the scope of this disclosure to any particular implementation for providing biometric feedback to a user. The operations as presented in FIG. 8 can be performed by HMD 150 as shown in FIG. 2.

As shown in FIG. 8, at operation 802, an HMD 150 receives biometric feedback from at least one sensor. The biometric feedback can include biometric information of a user, for example, user health and activity parameters such as the electrical activity of the heart (using ECG), blood pressure, hydration, respiration, blood oxygen saturation, or calories burned, and also user metrics such as activity, activity duration, distance traveled, position tracking, or pace. At operation 804, the HMD 150 displays the biometric feedback on a display. The biometric feedback could be a type of content that is anchored. In another example, the biometric feedback is unanchored. The display of the biometric feedback on the display is within a field of vision of the user, allowing a user to immediately and easily view the feedback.

Although FIG. 8 illustrates example process 800 for providing biometric feedback to a user, various changes could be made to FIG. 8. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A wearable device, comprising:
a memory configured to store a plurality of content for display;
a transceiver configured to receive the plurality of content from a connected device that includes a first display;
a second display configured to display the plurality of content; and
at least one processor coupled to the memory, the second display, and the transceiver, wherein the at least one processor is configured to:
control the second display to display a portion of the plurality of content that is organized in a first visual format at a display position on the second display, wherein the plurality of content, when shown on the first display of the connected device, is organized in a visual format that is different from the first visual format,
receive movement information based on a movement of the wearable device, and
adjust the display position to display another portion of the plurality of content according to the movement information of the wearable device.

2. The wearable device of claim 1, wherein the at least one processor is further configured to:
identify the movement of the wearable device; and
maintain a virtual position of the first visual format in coordinate space when the wearable device moves while adjusting the plurality of content that is displayed in the first visual format on the second display.

3. The wearable device of claim 2, wherein:
the transceiver is further configured to receive an input via the connected device; and
the at least one processor is further configured to adjust the virtual position and the display position based on the input.

4. The wearable device of claim 2, further comprising:
adjusting, via an interface of the connected device, the virtual position.

5. The wearable device of claim 1, wherein the movement includes one or more of a change in orientation or translation in coordinate space.

6. The wearable device of claim 1, wherein:
the content is part of an application; and
the at least one processor is further configured to:
receive a specific movement of the wearable device; and
perform a function within the application based on the specific movement.

7. The wearable device of claim 1, wherein the at least one processor is further configured to:
determine that a first subset of the plurality of content is anchored;
maintain the display position of the first subset of the plurality of content; and
adjust the display position of a second subset of the plurality of content that is not anchored according to the movement of the wearable device.

8. The wearable device of claim 1, wherein the at least one processor is further configured to:
determine whether the connected device is within a threshold range of the wearable device;
determine whether any of the plurality of content is restricted content; and
control the second display of the restricted content based on whether the connected device is within the threshold range.

9. A wearable device, comprising:
at least one sensor configured to obtain environment information;
a memory configured to store the environment information;
a display configured to display an alert based on the environment information; and
at least one processor coupled to the memory, the display, and the at least one sensor, wherein the at least one processor is configured to:
receive the environment information from the at least one sensor or the memory, the environment information comprising at least one of an indication of an obstacle within an environment and ambient audio within the environment;

when the environment information includes the obstacle, determine whether to trigger the alert based on a comparison of a distance between the wearable device and the obstacle to a threshold;

when the environment information includes the ambient audio, determine whether to trigger the alert based on a comparison of the ambient audio to at least one of a predefined decibel level and a predefined sound; and in response to a determination to trigger the alert, control the display to display the alert within a field of vision of a user.

10. The wearable device of claim 9, wherein:

the at least one sensor includes a headphone, and the at least one processor is further configured to control the headphone to provide an audible alert when the alert is triggered.

11. The wearable device of claim 9, wherein:

the at least one sensor includes a headphone, and when the headphone is providing sound prior to the alert, the at least one processor is further configured to control the headphone to at least one of reduce a volume of the sound during the alert or provide ambient sound.

12. The wearable device of claim 9, wherein:

the at least one sensor includes a camera configured to capture a view outside of the field of vision of the user, and the at least one processor is further configured to control the display to display the captured view.

13. The wearable device of claim 9, wherein the at least one processor is further configured to control the display, other than the displayed alert, to dim during the alert.

14. A wearable device, comprising:

a memory configured to store biometric information representing health and activity parameters that are associated with a user;

a display configured to display the biometric information; and at least one processor coupled to the memory and the display, wherein the at least one processor is configured to control the display to display the biometric information at a fixed position on the display that is relative to a field of vision of the user.

15. The wearable device of claim 14, further comprising at least one sensor configured to obtain the biometric information.

16. The wearable device of claim 14, further comprising a transceiver configured to receive the biometric information from a connected device.

17. The wearable device of claim 14, wherein the biometric information includes one or more of an electrical activity of heart, blood pressure, hydration, respiration, blood oxygen saturation, or calories burned.

18. A method of managing a plurality of content on a wearable device, the method comprising:

receiving the plurality of content from a connected device, wherein the plurality of content, when shown on a first display of the connected device, is organized in a first visual format;

displaying a portion of the plurality of content that is organized in a second visual format at a display position on a second display of the wearable device, wherein the second visual format is different than the first visual format;

receiving movement information based on a movement of the wearable device; and adjusting the display position to display another portion of the plurality of content according to the movement information of the wearable device.

19. The method of claim 18, further comprising:

identifying the movement of the wearable device; and maintaining a virtual position of the second visual format in coordinate space when the wearable device moves while adjusting the plurality of content that is displayed in the second visual format on the second display.

20. The method of claim 19, further comprising:

receiving an input via the connected device; and adjusting the virtual position and the display position based on the input.

* * * * *